United States Patent
Shimomura et al.

(10) Patent No.: US 11,110,592 B2
(45) Date of Patent: Sep. 7, 2021

(54) REMOTE CONTROL ROBOT SYSTEM

(71) Applicant: KAWASAKI JUKOGYO KABUSHIKI KAISHA, Kobe (JP)

(72) Inventors: Nobuyasu Shimomura, Kobe (JP); Masayuki Kamon, Akashi (JP); Jun Fujimori, Himeji (JP); Hiroki Kinoshita, Akashi (JP); Takuya Shitaka, Kakogawa (JP); Hiroki Takahashi, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 170 days.

(21) Appl. No.: 16/615,066

(22) PCT Filed: May 16, 2018

(86) PCT No.: PCT/JP2018/018957
§ 371 (c)(1),
(2) Date: Nov. 19, 2019

(87) PCT Pub. No.: WO2018/212239
PCT Pub. Date: Nov. 22, 2018

(65) Prior Publication Data
US 2020/0189091 A1 Jun. 18, 2020

(30) Foreign Application Priority Data
May 19, 2017 (JP) .............................. JP2017-100374

(51) Int. Cl.
*B25J 9/12* (2006.01)
*B25J 13/08* (2006.01)
(Continued)

(52) U.S. Cl.
CPC . *B25J 3/04* (2013.01); *B25J 9/12* (2013.01); *B25J 9/161* (2013.01); *B25J 9/1638* (2013.01);
(Continued)

(58) Field of Classification Search
CPC ....... B25J 3/04; B25J 9/12; B25J 13/08; B25J 13/02
See application file for complete search history.

(56) References Cited

U.S. PATENT DOCUMENTS

2012/0191245 A1* 7/2012 Fudaba ...................... B25J 3/04
700/254
2014/0195052 A1* 7/2014 Tsusaka ................. A61B 34/76
700/257
(Continued)

FOREIGN PATENT DOCUMENTS

JP H08-029508 B2 3/1996

*Primary Examiner* — Kira Nguyen
(74) *Attorney, Agent, or Firm* — Oliff PLC

(57) ABSTRACT

A remote control robot system includes a slave arm configured to perform a given work, a master arm having a motor configured to drive a joint, and configured to receive from an operator an operation to manipulate the slave arm, an instruction generating module configured to generate an instruction to apply to the master arm an imaginary external force in a given direction that is independent from a force received by the slave arm from the exterior, and a motor controller configured to supply, to the motor, drive current corresponding to the instruction sent from the instruction generating module.

8 Claims, 2 Drawing Sheets

(51) Int. Cl.
*B25J 3/04* (2006.01)
*B25J 9/16* (2006.01)
*B25J 13/02* (2006.01)

(52) U.S. Cl.
CPC ............ *B25J 9/1694* (2013.01); *B25J 13/02* (2013.01); *B25J 13/082* (2013.01)

(56) References Cited

U.S. PATENT DOCUMENTS

| | | | | |
|---|---|---|---|---|
| 2015/0073595 | A1* | 3/2015 | Fudaba | G05B 15/02 700/259 |
| 2015/0148952 | A1* | 5/2015 | Shiratsuchi | B25J 9/0084 700/248 |
| 2016/0332305 | A1* | 11/2016 | Gonzalez | B25J 13/025 |
| 2017/0001301 | A1* | 1/2017 | Kamiya | B25J 9/1689 |
| 2017/0050310 | A1* | 2/2017 | Kanaoka | B25J 13/025 |
| 2019/0358817 | A1* | 11/2019 | Ghazaei Ardakani | B25J 13/085 |

* cited by examiner

REMOTE CONTROL ROBOT SYSTEM

TECHNICAL FIELD

The present disclosure relates to a remote control robot system provided with a master arm and a slave arm.

BACKGROUND ART

Conventionally, remote control robot systems are known, which is provided with a master arm operated by an operator and a slave arm which operates according to the operation to the master arm. The operator operates the master arm to cause the slave arm to perform a work, such as assembly and maintenance of an apparatus. Among those remote control robot systems, there is a type, for example, which makes the operator sense through the master arm the gravity of an object held by the slave arm, a reaction force (contact force) which the slave arm or the object held by the slave arm receives by contacting another object. Patent Document 1 discloses this kind of technology.

In this kind of remote control robot system, for example, when the weight of the object held by the slave arm is large, since the operator operates the master arm while perceiving the weight, this could be a burden to the operator. The system disclosed in Patent Document 1 is configured to switch, by a switch, between a mode in which the operator who operates the master arm is made to sense only the reaction force which acts on the slave arm, or a mode in which the operator is made to sense the reaction force as well as the gravity of the object. In detail, the system disclosed in Patent Document 1 calculates the weight of the object held by the slave arm at a timing of setting. Then, if making the operator sense only the reaction force which acts on the slave arm, the master arm is driven, during a period other than the setting timing, based on a drive signal acquired by subtracting the force corresponding to the gravity of the object from the force received by the slave arm.

REFERENCE DOCUMENT OF CONVENTIONAL ART

Patent Document

[Patent Document 1] JP1996-029508B2

DESCRIPTION OF THE DISCLOSURE

Problems to be Solved by the Disclosure

However, like the system disclosed in Patent Document 1, if a given external force, such as the gravity of the object held by the slave arm, is completely canceled, a gap may arise between the feel anticipated by the operator and the feel received through the master arm. Such a gap of operational feel may have a bad influence on workability.

Therefore, one purpose of the present disclosure is to provide a remote control robot system which is improved in an operational feel received by an operator through a master arm.

SUMMARY OF THE DISCLOSURE

In order to solve the problems described above, a remote control robot system according to the present disclosure includes a slave arm configured to perform a given work, a master arm having a motor configured to drive a joint, and configured to receive from an operator an operation to manipulate the slave arm, an instruction generating module configured to generate an instruction to apply to the master arm an imaginary external force in a given direction, which is independent from a force received by the slave arm from the exterior, and a motor controller configured to supply, to the motor, drive current corresponding to the instruction sent from the instruction generating module.

According to this configuration, the operator is presented through the master arm the imaginary external force acting in the given direction which is independent from the force received by the slave arm from the exterior. Therefore, for example, by causing the external force which does not become a burden to act on the master arm in a direction in which the operator anticipates to receive the force, the gap between the feeling anticipated by the operator and the feeling received by the operator through the master arm can be reduced. Thus, the operational feel received by the operator through the master arm can be improved.

The remote control robot system may further include a setting value input part and a setting value memory. The setting value input part may receive an input of a setting value defining a magnitude and a direction of the imaginary external force. The setting value memory may store the setting value inputted from the setting value input part. The instruction generating module may generate the instruction based on the setting value stored in the setting value memory. According to this configuration, the magnitude and the direction of the imaginary external force are able to be set from the setting value input part, and thus the imaginary external force applied to the master arm can be suitably adjusted to the magnitude and the direction which is easy for the operator's manipulation.

For example, the remote control robot system may further include a holding hand provided to a tip end of the slave arm and configured to hold a workpiece, and a gravity compensating module configured to compensate a gravity of the workpiece held by the holding hand. The instruction generating module may generate the instruction to apply the imaginary external force in the gravity direction to the master arm when the workpiece is held by the holding hand. The imaginary external force is independent from the gravity of the workpiece held by the holding hand According to this configuration, by the gravity compensating module, the imaginary external force which does not become a burden can be acted on the master arm in the gravity direction, without reflecting on the master arm the gravity of the object held by the holding hand of the slave arm. Therefore, the operational burden of the master arm can be reduced, and the feeling of holding the object can be presented to the operator.

The remote control robot system may further include a grip part provided to a tip end of the master arm, and grippable by the operator, and a grip sensor configured to detect whether the grip part is gripped. The instruction generating module may generate the instruction to apply the imaginary external force to the master arm when the grip sensor is detected to be gripped, and may generate an instruction not to apply the imaginary external force to the master arm when the grip sensor is detected not to be gripped. According to this configuration, the imaginary external force acts on the tip end of the master arm in the given direction only while the operator grips the grip part, and the imaginary external force stops acting when the operator releases the grip part. Therefore, when the operator releases the grip part, it can be prevented that the master arm operates by the imaginary external force.

Effect of the Disclosure

According to the remote control robot system of the present disclosure, the operational feel received by the operator through the master arm can be improved.

MODE FOR CARRYING OUT THE DISCLOSURE

Hereinafter, one embodiment of the present disclosure will be described with reference to the drawings.
[Remote Control Robot System 100]

Figure 1:
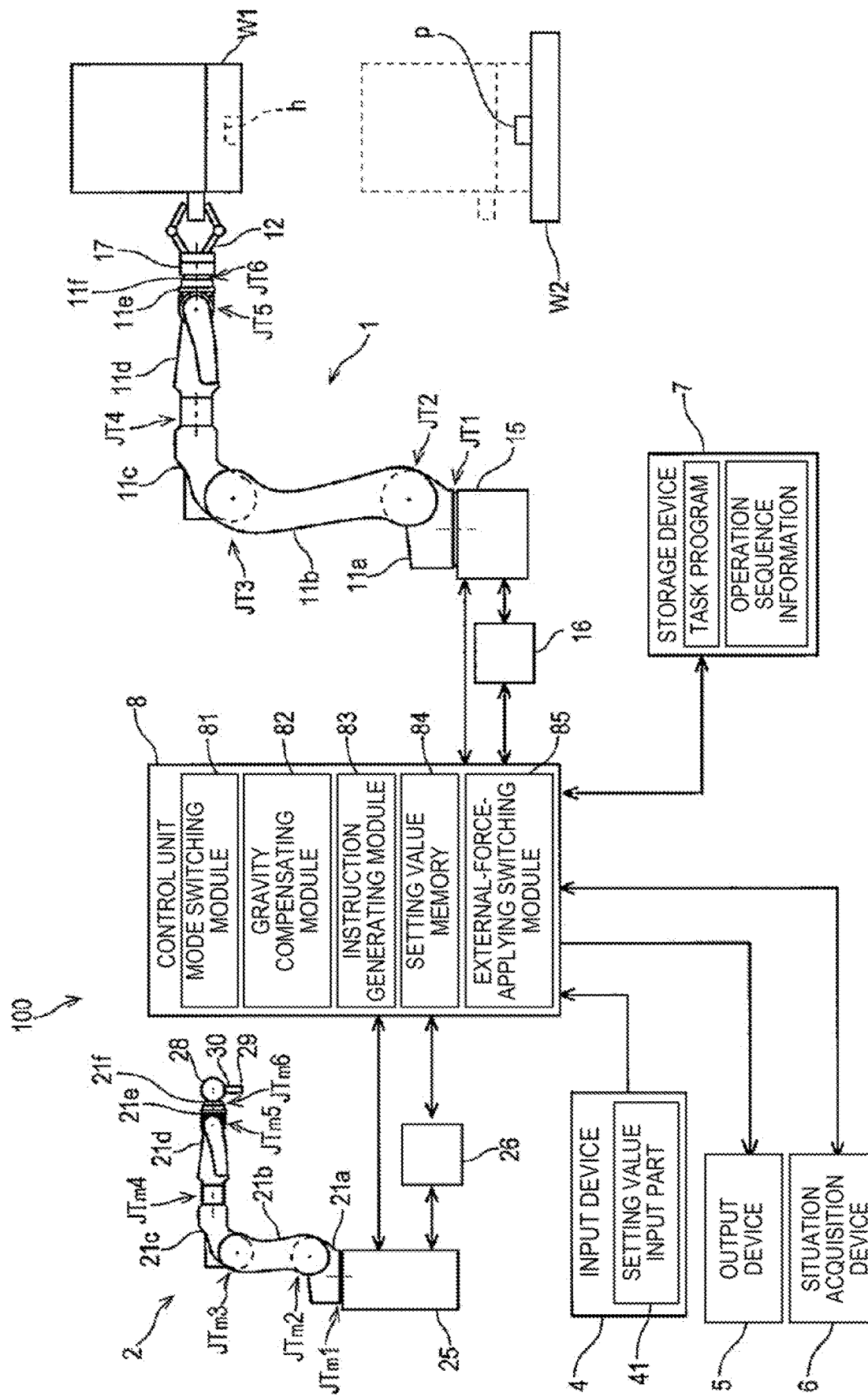
FIG. 1 is an outline configuration diagram of a remote control robot system according to one embodiment of the present disclosure.

FIG. 1 is an outline configuration diagram of a remote control robot system 100. As illustrated in FIG. 1, the remote control robot system 100 is a robot system of a master-slave type, and is provided with a slave arm 1 and a master arm 2. Moreover, the remote control robot system 100 includes an input device 4, an output device 5, a situation acquisition device 6, a storage device 7, and a control unit 8 which comprehensively controls the system 100.

In the remote control robot system 100, when an operator operates the master arm 2, the slave arm 1 which is located distant from the master arm 2 follows the motion of the master arm 2 to perform a given work. In this embodiment, the remote control robot system 100 may be a system which is built in an automobile assembly line and performs a work of attaching a seat to an automobile body.

In detail, as illustrated in FIG. 1, a seat (hereinafter, referred to as an "attaching object") W1 is an object (workpiece) held and moved by the slave arm 1, and a hole h is formed in the bottom of the attaching object W1. Moreover, the automobile body (hereinafter, referred to as a "to-be-attached object") W2 which is partially illustrated in FIG. 1 is supported by a support table (not illustrated), and a pin p which projects upwardly is provided to a given location of the to-be-attached object W2. The operator operates the master arm 2 to manipulate the slave arm 1, and as illustrated by a broken line, the attaching object W1 is moved downwardly so that the pin p of the to-be-attached object W2 is inserted into the hole h of the attaching object W1, thereby attaching the attaching object W1 onto the to-be-attached object W2.

Moreover, the remote control robot system 100 of this embodiment is configured to switch a mode between a control mode in which the operator operates the slave arm 1 through the master arm 2 (hereinafter, referred to as a "manual mode"), and a control mode in which the slave arm 1 is operated according to a task program set beforehand (hereinafter, referred to as an "automatic mode").

Below, each component of the remote control robot system 100 is described in detail.
[Slave Arm 1]

The slave arm 1 is an articulated robotic arm having a plurality of joints JT1-JT6, which is comprised of a serially-coupled body of a plurality of links 11a-11f, and a pedestal 15 which supports the serially-coupled body. In more detail, at a first joint JT1, the pedestal 15 is coupled to a base-end part of the first link 11a rotatably on an axis extending vertically. At a second joint JT2, a tip-end part of the first link 11a is coupled to a base-end part of the second link 11b rotatably on an axis extending horizontally. At a third joint JT3, a tip-end part of the second link 11b is coupled to a base-end part of the third link 11c rotatably on an axis extending horizontally. At a fourth joint JT4, a tip-end part of the third link 11c is rotatably coupled to a base-end part of the fourth link 11d on an axis extending in the longitudinal direction of the fourth link 11d. At a fifth joint JT5, a tip-end part of the fourth link 11d is coupled to a base-end part of the fifth link 11e rotatably on an axis perpendicular to the longitudinal direction of the fourth link 11d. At a sixth joint JT6, a tip-end part of the fifth link 11e is rotatably coupled to a base-end part of the sixth link 11f in a twisting manner.

An end effector corresponding to the type of a work is detachably attached to a tip-end part of the sixth link 11f. In this embodiment, the end effector is a holding hand 12 which holds the attaching object W1.

A drive motor (not illustrated) is provided to each of the joints JT1-JT6 of the slave arm 1, as one example of the actuator which relatively rotates two members coupled by the joint. These drive motors are, for example, servo motors which are servo-controlled by a motor controller 16. Although the motor controller 16 according to this embodiment is capable of solely carrying out the servo control of the plurality of drive motors, the motor controller may be provided corresponding to each drive motor. Moreover, each drive motor is provided with a position sensor (not illustrated) for detecting a rotational position of the motor, and a current sensor (not illustrated) for detecting current for controlling the rotation of the motor. The position sensor is, for example, an encoder. The drive motor, the position sensor, and the current sensor are electrically connected to the motor controller 16.

The motor controller 16 generates a torque instruction value (current instruction value) based on an instruction value acquired from the control unit 8 (in detail, an instruction generating module 83 described later), and supplies drive current corresponding to the torque instruction value to the drive motor of each of the joints JT1-JT6. The outputted rotational angle of the drive motor is detected by the position sensor, and is fed back to the motor controller 16. However, the functions of the motor controller 16 and the control unit 8 may be implemented as a sole circuit or a sole arithmetic unit.

Moreover, the slave arm 1 has a force sensor 17 which detects a force received from the exterior. In this embodiment, the force sensor 17 is to acquire a magnitude and a direction of a force fs applied to the slave arm 1 (hereinafter, referred to as a "contact force") when the slave arm 1 contacts another object (for example, the to-be-attached object W2). In this embodiment, the contact force fs is a reaction force which is applied to the slave arm 1 when the holding hand 12 or the attaching object W1 held by the holding hand 12 contacts the to-be-attached object W2. The force sensor 17 is comprised of a 3-axis force sensor which is capable of detecting force components which act in three axial directions perpendicular to each other.

In this embodiment, the force sensor 17 is provided to connect a tip-end part of the sixth link 11f with the holding hand 12. Therefore, force information detected by the force sensor 17 also includes the gravity of the holding hand 12 and the gravity of the attaching object W1 held by the holding hand 12. The force information detected by the force sensor 17 is sent to the control unit 8. In the control unit 8, a gravity compensating module 82 described later removes the gravity portion described above from the external force detected by the force sensor 17 and acquires the contact force fs. That is, in this embodiment, the force sensor 17 and the later-described gravity compensating module 82 constitute a contact force acquisition part 18 (refer to FIG. 2) which acquires the contact force fs.

However, the contact force acquisition part 18 is not limited to what acquires the contact force fs by the force sensor 17 and the gravity compensating module 82, but it may acquire the contact force fs, for example, by using the drive current of the drive motor of the slave arm 1.

[Master Arm 2]

The master arm 2 is a device to receive manipulation of the operator. In the remote control robot system 100 according to this embodiment, the slave arm 1 operates so that a hand part of the slave arm 1 follows the motion of a hand part of the master arm 2. That is, the master arm 2 is configured so that a position and a posture of the slave arm 1 can be operated intuitively. Moreover, in the remote control robot system 100 according to this embodiment, a bilateral control is adopted in which the hand part of the slave arm 1 follows the hand part of the master arm 2, and a force received by the slave arm 1 from the exterior is presented to the operator through the master arm 2.

In this embodiment, the master arm 2 is an articulated robotic arm having a plurality of joints JTm1-JTm6, which are the same in the number as the joints of the slave arm 1, and the master arm 2 is comprised of a pedestal 25 and a plurality of links 21*a*-21*f* which are coupled serially. The serially-coupling configuration of the links 21*a*-21*f* of the master arm 2 is substantially the same as the links 11*a*-11*f* of the slave arm 1, and detailed description thereof is omitted.

Note that, in this embodiment, although the master arm 2 has a similar structure to the slave arm 1, the master arm 2 may have a non-similar structure to the slave arm 1. For example, when operation of the slave arm 1 performed by the operator through the master arm 2 is only a vertical movement, the master arm 2 may be an articulated robotic arm having a less number of joints than the slave arm 1 (for example, only JTm2, JTm3, and JTm5).

Each of the joints JTm1-JTm6 of the master arm 2 is provided with a drive motor (not illustrated) as one example of an actuator which relatively rotates two members coupled by the joint. These drive motors are, for example, servo motors which are servo-controlled by a motor controller 26. Although the motor controller 26 according to this embodiment can solely carry out the servo control of the plurality of drive motors, the motor controller may be provided corresponding to each drive motor. Moreover, each drive motor is provided with a position sensor (not illustrated) for detecting a rotational position of the motor, and a current sensor (not illustrated) for detecting current for controlling the rotation of the motor. The position sensor is, for example, an encoder. The drive motor, the position sensor, and the current sensor are electrically coupled to the motor controller 26.

The motor controller 26 generates a torque instruction value (current instruction value) based on the instruction value acquired from the control unit 8 (in detail, the instruction generating module 83 described later), and supplies a drive current corresponding to the torque instruction value to the drive motor of each of the joints JTm1-JTm6. The outputted rotational angle of the drive motor is detected by the position sensor, and is fed back to the motor controller 26. However, the functions of the motor controller 26 and the control unit 8 may be implemented as a sole circuit or a sole arithmetic unit.

A gripper (a "grip part" of the present disclosure) 29 which is grippable by the operator is provided to a tip-end part of the sixth link 21*f* of the master arm 2 through a force sensor 28. In this embodiment, a magnitude and a direction of a force fm which is applied to the master arm 2 by the operation of the operator who grips the gripper 29 (hereinafter, referred to as a "control force") are detected by the force sensor 28. That is, in this embodiment, the force sensor 17 functions as a control force acquirer which acquires the control force fm. The force sensor 28 is comprised of a 3-axis force sensor which is detectable of force components which act in three axial directions perpendicular to each other. The control force fm detected by the force sensor 28 is sent to the control unit 8.

Moreover, the gripper 29 is provided with a grip sensor 30 which detects whether the gripper 29 is gripped. A detection signal generated by the grip sensor 30 is sent to the control unit 8.

[Input Device 4]

The input device 4 is an input device which is installed outside a workspace together with the master arm 2, and inputs an instruction received from the operator into the control unit 8. Operations other than the operation according to the position and the posture of the slave arm 1 are inputted into the input device 4. The input device 4 is provided with one or more operational input implements which input operational instructions excluding the position and the posture of the slave arm 1, such as an operational input implement for selecting a control mode of the slave arm 1, and an emergency stop switch. The one or more operational input implements may include, for example, known operational input implements, such as a touch panel, a key, a lever, a button, a switch, and a dial plate. Moreover, a mobile terminal, such as a pendant and a tablet, may be used as the input device 4.

In this embodiment, the input device 4 includes a setting value input part 41 which receives an input of a setting value for defining a magnitude and a direction of an imaginary external force described later. The setting value input part 41 is, for example, a touch panel and a key, which is capable of inputting a numerical value. The setting value inputted from the setting value input part 41 will be described later in detail.

[Output Unit 5]

The output device 5 is to output the information transmitted from the control unit 8. The output device 5 is installed at a position where the operator who operates the master arm 2 is easy to visually observe. The output device 5 includes at least a display device, and may further include a printer, a speaker, a hazard light, etc. The information transmitted from the control unit 8 is displayed and outputted on/to the display device. For example, from the speaker, the information transmitted from the control unit 8 is outputted as sound. Moreover, for example, from the printer, the information transmitted from the control unit 8 is printed out on a recording media, such as paper.

[Situation Acquisition Device 6]

The situation acquisition device 6 is a device to acquire status information indicative of a situation in the workspace of the slave arm 1. The status information includes information which is used for recognizing the position and the posture of the slave arm 1 in the workspace, or the situation around the slave arm 1. In more detail, the status information includes, for example, the position and the posture of the slave arm 1 in the workspace, a spatial relationship between the attaching object W1 held by the slave arm 1 and the to-be-attached object W2, and information required for enabling recognition of the situation of the slave arm 1 in the workspace and the situation around the slave arm 1. The situation acquisition device 6 is, for example, one or more camera devices which images the work situation of the slave arm 1, or a sensor which measures the position of the attaching object W1, the position of the to-be-attached object W2, and a distance between the attaching object W1 and the to-be-attached object W2.

[Storage Device 7]

The storage device 7 stores various task programs used for the control of the slave arm 1. The task program may be created as an operation flow for each work. For example, the task program is created by teaching, and is stored in the storage device 7 so as to be associated with identification information and a task of the slave arm 1. Note that, although the storage device 7 is described as an independent device from the control unit 8, the storage device provided to the control unit 8 may have the function of the storage device 7.

Moreover, the storage device 7 stores operation sequence information created beforehand. The operation sequence information is information on the operation sequence which defines a series of operation processes to be carried out by the slave arm 1 in the workspace. In the operation sequence information, an operating order of the operation processes is associated with a control mode of the slave arm 1. Moreover, in the operation sequence information, each operation process is associated with a task program for causing the slave arm 1 to automatically perform the operation. However, the operation sequence information may include a program for causing the slave arm 1 to automatically perform the work of each operation process.

[Control Unit 8]

As illustrated in FIG. 1, the slave arm 1, the master arm 2, the input device 4, the output device 5, the situation acquisition device 6, and the storage device 7 are communicatably connected to the control unit 8 wiredly or wirelessly.

The control unit 8 is a so-called calculator, and has a processor, such as a CPU, and a memory, such as a ROM and/or a RAM (none of them is illustrated). The memory stores a control program to be executed by the control unit 8, various fixed data, etc. The processor performs, for example, transmission and reception of data with external devices, such as the input device 4, the output device 5, the situation acquisition device 6, and the storage device 7. Moreover, the processor receives inputs of detection signals from various sensors, and outputs a control signal to each controlled target. The control unit 8 performs processing for controlling various operations of the system 100 by the processor reading and executing software, such as the program stored in the memory. Note that the control unit 8 may perform each processing by a centralized control of a sole calculator, or may perform each processing by a distributed control of a collaboration of a plurality of calculators. Moreover, the control unit 8 may comprised of a microcontroller, a programmable logic controller (PLC), etc.

The control unit 8 includes, as functional blocks, a mode switching module 81, the gravity compensating module 82, the instruction generating module 83, a setting value memory 84, and an external-force-applying switching module 85. In FIG. 1, although these functional blocks are collectively illustrated as a sole control unit 8, each functional block or a combination of a plurality of functional blocks may be implemented by one or more independent calculators. In this case, a part of these functional blocks may be disposed in the workspace, and the remainder may be disposed outside the work space.

The mode switching module 81 switches the control mode in which the slave arm 1 is operated, between the manual mode and the automatic mode which are described above. The switching of the control mode of the slave arm 1 by the mode switching module 81 is performed based on the above-described operation sequence information stored in the storage device 7. In this embodiment, the gravity compensation by the gravity compensating module 82 and the generation of the instruction by the instruction generating module 83 are performed when the control mode in which the slave arm 1 is operated is the manual mode.

The gravity compensating module 82 compensates the gravity of the attaching object W1 so that the gravity of the attaching object W1 held by the slave arm 1 is not be presented to the operator through the master arm 2. In detail, the force detected by the force sensor 17 includes, for example, the gravity of the attaching object W1 held by the slave arm 1. In the bilateral control, since the external force received by the slave arm is presented to the operator through the master arm, for example, if the weight of the object held by the slave arm is large, the operator operates the master arm while perceiving the weight, and therefore, it could be a burden for the operator. Therefore, in this embodiment, when the attaching object W1 is held by the holding hand 12, the gravity compensating module 82 performs a correction to exclude the gravity portion of the holding hand 12 and the gravity portion of the attaching object W1 held by the holding hand 12 from the value detected by the force sensor 17 of the slave arm 1. By correcting in this way, the contact force fs is acquired and it is sent to the instruction generating module 83 (described later).

The instruction generating module 83 generates an instruction value to be sent to the motor controllers 16 and 26. The remote control robot system 100 according to this embodiment adopts a parallel type bilateral control. That is, the instruction generating module 83 in this embodiment is a positional instruction generating module which generates a positional instruction value Xd,s to be sent to the motor controller 16 at the slave arm 1 end, and a positional instruction value Xd,m to be sent to the motor controller 26 at the master arm 2 end based on information on the contact force fs and information on the control force fm. A slave coordinate system of the slave arm 1 is associated with a master coordinate system of the master arm 2.

Figure 2:
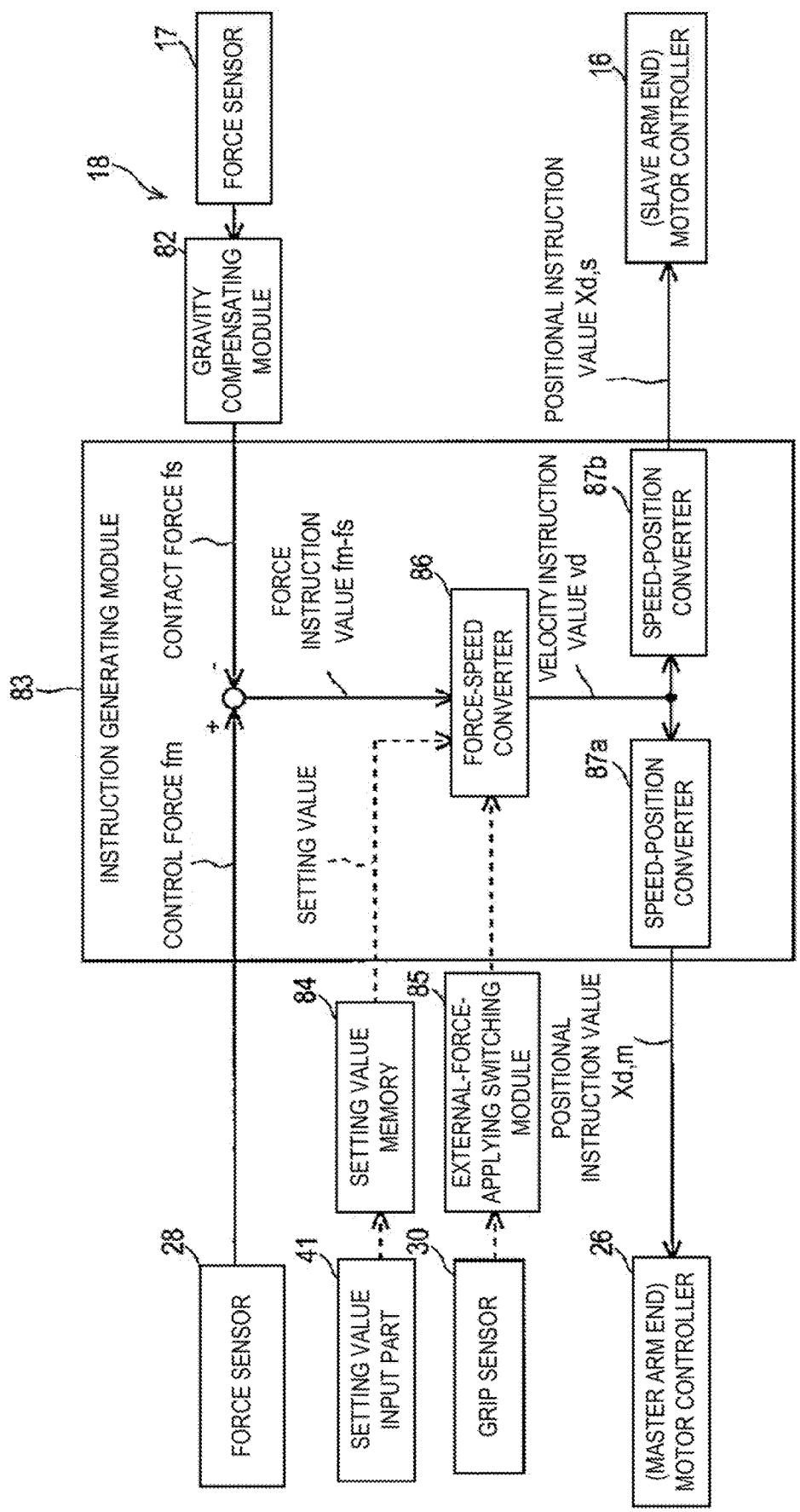
FIG. 2 is a control block diagram illustrating an outline of an instruction generation performed by an instruction generating module illustrated in FIG. 1.

FIG. 2 is a control block diagram illustrating an outline of the instruction generation by the instruction generating module 83. In this embodiment, the instruction generating module 83 has functional parts of a force-speed converter 86 and speed-position converters 87*a* and 87*b*.

The force-speed converter 86 calculates a velocity instruction value vd which defines a moving direction and a moving speed of the hand part of the slave arm 1 from a force instruction value based on the contact force fs and the control force fm. The velocity instruction value vd is a velocity vector, and is calculated as a velocity instruction value vdx in the x-axis direction extending in a given horizontal direction, a velocity instruction value vdy in the y-axis direction which is perpendicular to the x-axis and extending horizontally, and a velocity instruction value vdz in the z-axis direction extending in the gravity direction.

In this embodiment, the force-speed converter 86 generates the velocity instruction value vd which is obtained by applying an imaginary external force, i.e., an imaginary gravity in the gravity direction (the z-direction) to the master arm 2. Here, the "imaginary external force" is independent from an external force which actually acted on the slave arm 1, i.e., the external force detected by the force sensor 28.

In detail, the force-speed converter 86 calculates the velocity instruction value vd by using the following conversion formula (1) from the force instruction value based on the control force fm and the contact force fs so that the imaginary gravity is applied to the master arm 2.

$$M \times \dot{v}_d + C_v \times v_d + m \times g = f_m - f_s \quad (1)$$

Note that, M is a given mass value,
$C_v$ is a given viscosity coefficient,
m is a given mass value,
$v_d$ is a velocity vector, and $[v_{dx}, v_{dy}, v_{dz}]^T$,
$\dot{v}_d$ is an acceleration vector, and time derivative of $v_d$,
g is a gravity vector, and $[0, 0, g_0]^T$ ($g_0$ is a gravity acceleration),
$f_m$ is a control force vector, and $[f_{mx}, f_{my}, f_{mz}]^T$, and
$f_s$ is a contact force vector, and $[f_{sx}, f_{sy}, f_{sz}]^T$.

Here, in the left side of the formula (1), the term of "m×g" is a term for applying the imaginary gravity described above to the hand part of the master arm 2, and "m" is an imaginary mass set beforehand.

The meaning of the term of "m×g" in the above-described conversion formula (1) is described. Since the gravity of the object held by the holding hand 12 is compensated by the gravity compensating module 82 as described above, the feeling of holding the object will not be presented to the operator if the instruction value is generated only based on the contact force fs and the control force fm according to the conventional parallel type bilateral control. Therefore, the force-speed converter 86 in this embodiment generates the velocity instruction value vd by adding the term of "m×g" like the above-described conversion formula (1) so that a force which does not become a burden in the gravity direction acts on the master arm 2.

The velocity instruction value vd acquired by the force-speed converter 86 is sent to the speed-position converter 87a at the slave arm 1 end and the speed-position converter 87b at the master arm 2 end. The speed-position converters 87a and 87b generate the positional instruction value Xd,s of the slave arm 1 and the positional instruction value Xd,m of the master arm 2 as required, on real time, using the velocity instruction value vd, respectively. The positional instruction value Xd,s generated by the speed-position converter 87a are sent to the motor controller 16 at the slave arm 1 end, and the motor controller 16 controls the operation of the slave arm 1 based on the positional instruction value Xd,s. The positional instruction value Xd,m generated by the speed-position converter 87b are sent to the motor controller 26 at the master arm 2 end, and the motor controller 26 controls the operation of the master arm 2 based on the positional instruction value Xd,m. In this way, since the operation of the master arm 2 is controlled based on the positional instruction value Xd,m for causing the imaginary gravity to act on the master arm 2, the feeling of holding the object is presented to the operator through the master arm 2.

The setting value memory 84 stores a setting value inputted from the setting value input part 41. The setting value stored in the setting value memory 84 is used for the generation of the instruction value by the instruction generating module 83. The setting value stored in the setting value memory 84 includes the value of "m" (imaginary mass m) in the above-described formula (1). The magnitude of the force in the gravity direction acting on the master arm 2 is changed according to the imaginary mass m stored in the setting value memory 84. For example, the imaginary mass m is set from the setting value input part 41 so that it does not become a burden of the operator who operates the master arm 2 (for example, 1.5 kg). Moreover, the setting value stored in the setting value memory 84 may include the values of "M" and "Cv" in the above-described formula (1).

The external-force-applying switching module 85 switches the generation method of the instruction value by the instruction generating module 83 so that the instruction for applying the imaginary external force to the above-described master arm 2 is generated only when the operator grips the gripper 29. In detail, the external-force-applying switching module 85 switches the conversion formula for converting the force instruction value based on the control force fm and the contact force fs in the force-speed converter 86 into the velocity instruction value vd according to the detection signal sent to the control unit 8 from the grip sensor 30.

That is, if the grip sensor 30 detects that the gripper 29 is gripped, the external-force-applying switching module 85 sets the conversion formula used by the force-speed converter 86 as the above-described conversion formula (1). Therefore, the instruction generating module 83 generates an instruction to apply the imaginary gravity to the tip end of the master arm 2.

If the grip sensor 30 detects that the gripper 29 is not gripped, the external-force-applying switching module 85 sets the conversion formula used by the force-speed converter 86 to the following conversion formula (2) so that the imaginary gravity is not applied to the master arm 2.

$$M \times \dot{v}_d + C_v \times v_d = f_m - f_s \quad (2)$$

The above-described conversion formula (2) is obtained by removing the term "m×g" of the imaginary gravity to be acted on the master arm 2 from the left side of the above-described conversion formula (1). In this way, the velocity instruction value vd is acquired based on the contact force fs and the control force fm, and the positional instruction values Xd,s and Xd,m are generated by the speed-position converters 87a and 87b, respectively. As a result, the imaginary gravity acts on the tip end of the master arm 2 only while the operator grips the gripper 29, and the imaginary gravity stops acting when the operator releases the gripper 29. Therefore, when the operator releases the gripper 29, the slave arm 1 and the master arm 2 are prevented from operating by the imaginary gravity set beforehand in the setting value input part 41.

Moreover, if the grip sensor 30 detects that the gripper 29 is not gripped, the external-force-applying switching module 85 may switch the conversion formula to the following formulas (3) and (4), instead of the above-described conversion formula (2).

$$M \times \dot{v}_d + C_v \times v_d + m \times g = f_m - f_s + f_v \quad (3)$$

$$f_v = k \times (X_v - X_{d,s}) + m \times g \quad (4)$$

Note that, k is a given coefficient.

The above-described formula (3) is obtained by adding an imaginary external force fv for moving the hand part of the slave arm 1 to a given position to the right-hand side of the above-described conversion formula (1). In the right-hand side of the above-described formula (4), "Xv" is a target position of the hand part of the slave arm 1 set beforehand, and "Xd,s" is a current position of the hand part of the slave arm 1. When the operator releases the gripper 29 and the formula is switched to the above-described formulas (3) and (4), the hand part of the slave arm 1 set beforehand moves toward the target position Xv. Then, unless the slave arm 1 receives an external force from the exterior (fs=0), the hand part of the slave arm 1 stops at the target position Xv. Here, the target position Xv is set as a safe position where the hand part of the slave arm 1 does not contact another object even if the hand part moves to the position. Thus, since the hand part of the slave arm 1 moves to the given position after the operator releases the gripper 29, the attaching object W1 held by the holding hand 12 is prevented from moving downwardly and colliding with a floor etc. by the imaginary gravity.

The value of "k" and the value of "Xv" (i.e., position coordinates in the slave coordinate system) in the above-described formula (4) may be included in the setting value stored in the setting value memory 84.

[Operation of Remote Control Robot System 100]

Next, one example of operation of the remote control robot system 100 of the above configuration is described.

The operation sequence information on the attachment work of the attaching object (seat) W1 to the to-be-attached object (automobile body) W2 stored in the storage device 7 is comprised of an extraction task T1 for taking out the attaching object W1 from a container, a conveyance task T2 for conveying the attaching object W1 to near an attaching position of the to-be-attached object W2, and an attaching task T3 for attaching the attaching object W1 located near the attaching position to the attaching position. These tasks T1-T3 are repeatedly performed in this order.

In the beginning, the control unit 8 reads given operation sequence information stored in the storage device 7, and starts a control of the system 100 in accordance with the operation sequence information. First, the control unit 8 reads the task program of the extraction task T1 from the storage device 7 and executes the task program. Subsequently, the control unit 8 reads the task program of the conveyance task T2 and executes the task program. In the extraction task T1 and the conveyance task T2, the control unit 8 controls the operation of the slave arm 1 in the automatic mode.

After the conveyance task T2 is finished, the control unit 8 displays a selection screen for urging the operator a selection of the control mode for the subsequent attaching task T3 on the display device. At the same time, the control unit 8 outputs the status information on the slave arm 1 for which the control mode is about to be selected to the display device. Here, the status information displayed and outputted on/to the display device may include the identification information on the slave arm 1 currently projected, and contents of the subsequent process.

The operator visually observes the status information on the slave arm 1 displayed on the display device, and, for example, selects the manual mode or the automatic mode by using the master arm 2 or the input device 4. Here, if the manual mode is selected, the control unit 8 switches the control mode of the slave arm 1 from the automatic mode to the manual mode by the mode switching module 81.

Although the attaching object W1 is held by the holding hand 12 of the slave arm 1 when the control mode is switched to the manual mode, since the gravity portion of the force detected by the force sensor 28 is removed by the gravity compensating module 82, the gravity of the attaching object W1 does not act on the master arm 2. Moreover, when the operator does not grip the gripper 29, the imaginary gravity does not act on the master arm 2, either. That is, the positional instruction value is generated by the instruction generating module 83 based on the above-described conversion formula (2).

When the operator grips the gripper 29, the external-force-applying switching module 85 switches the conversion formula from the conversion formula (2) to the conversion formula (1) for causing the imaginary gravity to act on the master arm 2. Therefore, the operator operates the master arm 2 to manipulate the slave arm 1, while receiving the force in the gravity direction through the master arm 2. In this way, the operator operates the master arm 2 to bring the attaching object W1 closer to the to-be-attached object W2 in order to insert the pin p of the to-be-attached object W2 into the hole h of the attaching object W1.

When bringing the attaching object W1 closer to the to-be-attached object W2, if the position of the hole h is deviated from the position of the pin p and the pin p contacts the bottom of the attaching object W1 (i.e., a surrounding surface of the hole h), the vertically-upward contact force fs increases, and the force in the gravity direction (vertically downward) which is presented to the operator through the master arm 2 is reduced. For example, if the contact force fs balances with the imaginary gravity m×g, the force in the gravity direction which is presented to the operator through the master arm 2 becomes zero. Therefore, the operator can recognize through the master arm 2 that the bottom of the attaching object W1 rides on the pin p of the to-be-attached object W2.

Then, when the attaching object W1 is shifted horizontally and the position of the hole h is coincided with the position of the pin p, the vertically-upward contact force fs becomes zero, and the imaginary gravity is again presented to the operator through the master arm 2. Therefore, the operator can recognize through the master arm 2 that the pin p of the to-be-attached object W2 is inserted into the hole h of the attaching object W1.

In this way, when the attachment of the attaching object W1 to the to-be-attached object W2 is finished, the control returns to the extraction task T1. As described above, the control unit 8 sequentially proceeds the operation processes along the operation sequence.

In the remote control robot system 100 according to this embodiment, the operator is presented through the master arm 2 the imaginary gravity which is independent from the external force received by the slave arm 1 and acts so as not to become a burden in the gravity direction. That is, by the gravity compensating module 82, the imaginary gravity set from the setting value input part 41 is acted on the master arm 2, for example, without reflecting in the master arm 2 the gravity of the attaching object W1 held by the holding hand 12 of the slave arm 1. Therefore, the gap between the feeling anticipated by the operator (the feeling of holding the object) and the feeling actually received by the operator through the master arm 2 can be reduced. Thus, the operational feel received by the operator through the master arm 2 can be improved.

Moreover, in this embodiment, since the magnitude and the direction of imaginary external force can be set from the setting value input part 41, the imaginary external force applied to the master arm 2 can be suitably adjusted to the magnitude and the direction which is easy for the operator's manipulation. Therefore, the operational burden of the master arm 2 can be reduced, and the feeling of holding the object can be presented to the operator. Further, the imaginary external force applied to the master arm 2 is set beforehand from the setting value input part 41, and is independent from the force detected by the force sensor 17.

Therefore, regardless of the weight of the object held by the holding hand 12, the imaginary gravity applied to the master arm 2 can be made constant.

The present disclosure is not limited to the embodiment described above, and may be variously modified without departing from the spirit of the present disclosure.

For example, in the above embodiment, although the master arm 2 and the slave arm 1 are controlled by the parallel type bilateral control, the bilateral control applied to the present disclosure is not limited to the parallel type. For example, any of bilateral controls, such as a symmetrical type, a force reflection type, and a force feedback type, is applicable to the present disclosure. Moreover, the control scheme applied to the present disclosure may not be the bilateral control. That is, the force received by the slave arm 1 from the exterior may not act on the master arm 2, and only the imaginary gravity may act on the master arm 2.

Moreover, in the above embodiment, although the instruction generating module 83 generates the instruction value for applying the imaginary external force in the gravity direction to the master arm 2, the magnitude and the direction of the imaginary external force can be suitably changed according to the work performed by the slave arm 1. For example, if performing a work to stir viscous liquid by a bar-shaped object held by the slave arm 1, the instruction generating module 83 may generate an instruction to cause the viscous drag received from the liquid to act on the master arm 2. In this case, the imaginary external force may act in the opposite direction from a direction of operating the master arm 2 (the moving direction of the bar-shaped object).

Moreover, in the above embodiment, although the magnitude and the direction of the imaginary external force are able to be suitably set from the setting value input part 41, the remote control robot system according to the present disclosure may not be provided with the setting value input part 41 so that the magnitude and the direction of the imaginary external force are not changed by the operator from what are set beforehand.

DESCRIPTION OF REFERENCE CHARACTERS

100: Remote Control Robot System
1: Slave Arm
2: Master Arm
12: Holding Hand
16: Motor Controller
26: Motor Controller
29: Gripper
30: Grip Sensor
41: Setting Value Input Part
82: Gravity Compensating Module
83: Instruction Generating Module
84: Setting Value Memory
W1: Attaching Object
W2: To-Be-Attached Object
fm: Control Force
fs: Contact Force

What is claimed is:

1. A remote control robot system, comprising:
a slave arm configured to perform a given work;
a master arm having a motor configured to drive a joint, and configured to receive from an operator an operation to manipulate the slave arm;
an instruction generating module configured to generate an instruction to apply to the master arm an imaginary external force in a given direction that is independent from a force received by the slave arm from the exterior; and
a motor controller configured to supply, to the motor, drive current corresponding to the instruction sent from the instruction generating module.

2. The remote control robot system of claim 1, further comprising:
a setting value input part configured to receive an input of a setting value defining a magnitude and a direction of the imaginary external force; and
a setting value memory configured to store the setting value inputted from the setting value input part,
wherein the instruction generating module generates the instruction based on the setting value stored in the setting value memory.

3. The remote control robot system of claim 2, further comprising:
a holding hand provided to a tip end of the slave arm and configured to hold a workpiece; and
a gravity compensating module configured to compensate a gravity of the workpiece held by the holding hand,
wherein the instruction generating module generates the instruction to apply the imaginary external force in the gravity direction to the master arm when the workpiece is held by the holding hand, the imaginary external force being independent from a gravity of the workpiece held by the holding hand.

4. The remote control robot system of claim 3, further comprising:
a grip part provided to a tip end of the master arm, and grippable by the operator; and
a grip sensor configured to detect whether the grip part is gripped,
wherein the instruction generating module generates the instruction to apply the imaginary external force to the master arm when the grip sensor is detected to be gripped, and generates an instruction not to apply the imaginary external force to the master arm when the grip sensor is detected not to be gripped.

5. The remote control robot system of claim 2, further comprising:
a grip part provided to a tip end of the master arm, and grippable by the operator; and
a grip sensor configured to detect whether the grip part is gripped,
wherein the instruction generating module generates the instruction to apply the imaginary external force to the master arm when the grip sensor is detected to be gripped, and generates an instruction not to apply the imaginary external force to the master arm when the grip sensor is detected not to be gripped.

6. The remote control robot system of claim 1 further comprising:
a holding hand provided to a tip end of the slave arm and configured to hold a workpiece; and
a gravity compensating module configured to compensate a gravity of the workpiece held by the holding hand,
wherein the instruction generating module generates the instruction to apply the imaginary external force in the gravity direction to the master arm when the workpiece is held by the holding hand, the imaginary external force being independent from a gravity of the workpiece held by the holding hand.

7. The remote control robot system of claim 6, further comprising:
- a grip part provided to a tip end of the master arm, and grippable by the operator; and
- a grip sensor configured to detect whether the grip part is gripped,
- wherein the instruction generating module generates the instruction to apply the imaginary external force to the master arm when the grip sensor is detected to be gripped, and generates an instruction not to apply the imaginary external force to the master arm when the grip sensor is detected not to be gripped.

8. The remote control robot system of claim 1, further comprising:
- a grip part provided to a tip end of the master arm, and grippable by the operator; and
- a grip sensor configured to detect whether the grip part is gripped,
- wherein the instruction generating module generates the instruction to apply the imaginary external force to the master arm when the grip sensor is detected to be gripped, and generates an instruction not to apply the imaginary external force to the master arm when the grip sensor is detected not to be gripped.

* * * * *